(12) United States Patent
Barsukov et al.

(10) Patent No.: US 8,030,934 B2
(45) Date of Patent: Oct. 4, 2011

(54) METHOD FOR HYDROCARBON RESERVOIR MAPPING AND APPARATUS FOR USE WHEN PERFORMING THE METHOD

(75) Inventors: Pavel Barsukov, Amersfoort (NL);
Eduard B. Fainberg, Amersfoort (NL);
Bension Sh. Singer, East Victoria Park (AU)

(73) Assignee: Advanced Hydrocarbon Mapping AS, Stavanger (NO)

( * ) Notice: Subject to any disclaimer, the term of this patent is extended or adjusted under 35 U.S.C. 154(b) by 685 days.

(21) Appl. No.: 12/092,427

(22) PCT Filed: Oct. 26, 2006

(86) PCT No.: PCT/NO2006/000372
§ 371 (c)(1),
(2), (4) Date: Aug. 18, 2008

(87) PCT Pub. No.: WO2007/053025
PCT Pub. Date: May 10, 2007

(65) Prior Publication Data
US 2009/0219029 A1    Sep. 3, 2009

(30) Foreign Application Priority Data
Nov. 3, 2005  (NO) .................................. 20055168

(51) Int. Cl.
*G01V 3/12* (2006.01)
*G01V 3/00* (2006.01)
*G01V 3/06* (2006.01)
*G01V 1/40* (2006.01)

(52) U.S. Cl. ............ 324/334; 324/345; 324/360; 702/13

(58) Field of Classification Search ................... 324/334
See application file for complete search history.

(56) References Cited

U.S. PATENT DOCUMENTS
4,617,518 A    10/1986    Sruka
(Continued)

FOREIGN PATENT DOCUMENTS
WO    WO 01/57555    8/2001
(Continued)

OTHER PUBLICATIONS

Edwards et al., "On Measuring The Electrical Conductivity of the Oceanic Crust By A Modified Magnetometric Resistivity Method (1981)," American Geophysical.
(Continued)

*Primary Examiner* — M'Baye Diao
(74) *Attorney, Agent, or Firm* — GableGotwals

(57) ABSTRACT

A method is proposed for a marine electromagnetic survey based on the TM mode, for the purpose of prospecting for and detecting subsurface hydrocarbon reservoirs. The method includes an electromagnetic field source (1113) that, in a submerged, essentially vertical transmitter antenna, generates and injects electric current pulses (81,82) with a sharply defined termination. An electromagnetic field generated by these pulses (81,82) is measured by at least one receiver (1109) provided with an essentially vertical receiver antenna (1111) submerged in water, during the interval when the current in the transmitter antenna (1108) of the electromagnetic field source (1113) is switched off. The distance between the electromagnetic field source (1113) and the at least one receiver (1109) is smaller than the depth of the target object. An apparatus is also described, for implementation of the method.

16 Claims, 7 Drawing Sheets

U.S. PATENT DOCUMENTS

| | | | |
|---|---|---|---|
| 4,644,892 A | 2/1987 | Fisher | |
| 5,563,513 A | 10/1996 | Tasci et al. | |
| 6,320,386 B1 | 11/2001 | Balashov et al. | |
| 6,603,313 B1 | 8/2003 | Srnka | |
| 6,628,119 B1 | 9/2003 | Eidesmo et al. | |
| 2003/0048105 A1 | 3/2003 | Ellingsrud et al. | |
| 2003/0052685 A1 | 3/2003 | Ellingsrud et al. | |
| 2004/0113625 A1* | 6/2004 | Pagano et al. | 324/334 |
| 2004/0150404 A1 | 8/2004 | Ellingsrud et al. | |
| 2005/0017722 A1 | 1/2005 | Ellingsrud et al. | |
| 2005/0264294 A1 | 12/2005 | Constable | |
| 2006/0038570 A1 | 2/2006 | Constable | |

FOREIGN PATENT DOCUMENTS

| | | |
|---|---|---|
| WO | WO 02/14906 | 2/2002 |
| WO | WO 03/025803 | 3/2003 |
| WO | WO 03/034096 | 4/2003 |
| WO | WO 03/048812 | 6/2003 |
| WO | WO 2004/008183 | 1/2004 |
| WO | WO 2004/109338 | 12/2004 |
| WO | WO 2006/003360 | 1/2006 |

OTHER PUBLICATIONS

Ellingsrud et al, "Remote Sensing of Hydrocarbon Layers by Seabed Logging (SBL): Results For A Cruise Offshore Angola (Oct. 2002)," The Leading Edge, (p.

Kaufman et al., "Frequency and Tranient Soundings (1983)," Elsevier Science Publishing, (p. 411-454).

Wright et al., "Hydrocarbon Detection With A Multi-Channel Transient Electromagnetic Survey (Sep. 9-14, 2001)," SEG Intl Exposition and Annual.

PCT Office, "Written Opinion of the International Searching Authority," PCT Office, (Jan. 25, 2007).

PCT Office, "International Preliminary Report on Patentability," PCT Office, (Sep. 25, 2007).

Constable, "Marine Electromagnetic Methods—A Tool for Offshore Exploration ," The Leading Edge, p. 438-444.

Constable and C.J. Weiss, "Mapping Think Reservoirs and Hydrocarbons With Marine EM Methods: Insights from 1D Modeling," Geophysics, p. G43-G51, (Aug. 20, 2006).

Singer B. Sh,. Fainberg E.B. , "Electromagnetic Induction In Non-Uiform Thin Layers," Izmiran, p. 234, (Aug. 20, 1985).

Singer, B. Sh., Mezzatesta, A. & Wang T., "Integral Equation Approach Based on Contraction Operators and Krylov Space Optimization," Three Dimensional Electromagnetics III, ASEG, p. 1-14, (Aug. 20, 2003).

Singer, B. Sh. & Fainberg, E.B., "Fast Inversion of Synchronous Soundings With Natural and Controllable Sources of the Electromagnetic Field," Physics of the Solid Earth, Izvestiy, p. 580-584 , (Aug. 20, 2005).

Sinha, M.C., Patel P.D. Unsworth M.J., Owen T. R.E., Maccormak M.R.G., "An Active Source Electromagnetic Sound System for Marine Use," Marine Geophysics, p. 59-68, Aug. 20, 1990.

Admundsen et al., "A Sea Bed Logging (SBL) Calibration Survey Over The Troll Gas Fied, 66th EAGE Conference and Exhibition," (Jun. 6, 2004).

Chave et al., "Controlled Electromagnetic Sources For Measuring Electrical Conductivity Beneath The Oceans, 1982," Journal of Geophysical Research.

Chave A.D. et al., "Electrical Exploration Methods For The Seafloor, Chapter 12, 1991," Society Explor. Geophysics.

Cheesman et al., "On The Theory Of Sea Floor Conductivity Mapping Using Transient Electromagnetic Systems, 1987," Geophysics.

Chew et al., "A 3-D Perfectly Matched Medium From Modified Maxwell's Equations With Stretched Coordinates, 1994," IEEE Microwave and Guided Wave Letters.

Cox et al., "Controlled-Source Electromagnetic Sounding Of The Oceanic Lithosphere, 1986," Nature.

Constable et al., "Marine Magnetotellurics For Petroleum Explorations, Part I: A Sea-Floor Equipment System, 1998," Geophysics.

Coggon et al., "Electromagnetic Investigation Of The Sea Floor, 1970," Geophysics.

Edwards et al., "On Measuring The Electrical Conductivity Of The Oceanic Crust By A Modified Magnetometric Resistivity Method, 1981," J. Geophys. Res.

Edwards et al., "Offshore Electrical Exploration Of Sedimentary Basins: The Effects of Anisotrophy In HOrizontally Isotropic, Layered Media, 1984," Society of.

Edwards et al., First Results of The MOSES Experiment: SEa Sediment Conductivity and Thickness Determination, Bute Inlet, British Columbia, By.

Edwards et al., "A transient Electric Dipole-Dipole Method For Mapping The Conductivity Of The Sea Floor, 1986," Society of Exploration Geophysicists.

Edwards, R. Nigel, "On The Resource Evaluation Of Marine Gas Hydrate Deposits Using Sea-Floor Transient Electric Dipole-Dipole Methods, 1997," Society of Exploration.

Edwards, R.N., Two-Dimensional Modeling Of A Towed In-Line Electric Dipole-Dipole Sea-Floor Electromagnetic System: The Optimun Time Delay Or.

Eidesmo et al., "Sea Bed Logging (SBL), A New Method For Remote and Direct Identification Of Hydrocarbon Filled Layers In Deepwater Areas, 2002," First Break.

Ellingsrud et al., "Remote Sensing Of Hydrocarbon Layers by Seabed Logging (SBL): Results From A Cruise Offshore Angola, 2002 ," The Leading Edge.

Farelly et al., "Remote Characterization Of Hydrocarbon Filled Reservoirs At The Troll Field By Sea Bed Logging, 2004," EAGE Fall Research Workshop.

Greer et al., "Remote Mapping Of Hydrocarbon Extent Using Marine Active Source EM Sounding, 2003," EAGE 65th Conference and Exhibition.

Haber et al., "Invesion of 3D Electromagnetic Data In Frequency and Time Domain Using An Inexact All-At-Once Approach, 2002," Society of Exploration Geophysicists.

Johansen et al., "Subsurface Hydrocarbons Detected By Electromagnetic Sounding, 2005," First Break.

Kong et al., ""seabed Logging": A Possible Direct Hydrocarbon Indicator FOr Deepsea Prospects Using EM Energy, 2002," Oil And Gas Journal.

Macgregor et al., "Use Of Marine Controlled-Source Electromagnetic Sounding For Sub-Basalt Exploration, 2000," European Association of Geoscientists and Engineers.

Macgregor et al., "Electrocal Resistivity Structure Of The Valu Fa Ridge, Lau Basin, From Marine Controlled-Source Electromagnetic Sounding, 2001," Geophysical J.

Macgregor et al., "Marine Active Source Electromagnetic Sounding For Hydrocarbon Detection, 2004," 66th EAGE Conference and Exhibition.

Phoenix Geophysics LTD., "Marine MT in China With Phoenix Equipment, 2004," Phoenix Geophysics Ltd.

Singer, B. Sh., "Method For Solution of Maxwell's Equations In Non-Uniform Media, 1995," Geophys. J. Int.

Tompkins et al., "Sensitivity To Hydrocarbon Targets Using Marine Active Source EM Sounding: Diffusive EM Imaging Methods, 2004," 66th EAGE Conference and.

Wicklund et al., "Norwegian Sea—SBL Case Study, 2004," EAGE 66th Conference and Exhibition.

Wolfgram et al., "Polymetallic Sulfide Exploration On The Deep Sea Floor: The Feasibility Of The MINI-MOSES Experiment, 1986," Geophysics.

Yuan et al., "Towed Seafloor Electromagnetics and Assessment Of Gas Hydrate Deposits, 2001," Geophys. Res. Lett.

Yuan et al., "The ASsessment Of Marine Gas Hydrates Through Electrical Remote Sounding: Hydrate Without A BSR?, 2004," Geophys. Res. Lett.

Ziolkovski et al., "First Direct Hydrocarbon Detection and Reservoir Monitoring Using Transient Electromagnetics, 2002," First Break.

* cited by examiner

METHOD FOR HYDROCARBON RESERVOIR MAPPING AND APPARATUS FOR USE WHEN PERFORMING THE METHOD

CROSS-REFERENCE TO PENDING APPLICATIONS

This application is based on PCT Patent Application No. NO2006/000372, filed on Oct. 26, 2006, which was based on Norwegian Patent Application No. 20055168, filed on Nov. 3, 2005.

The invention regards a method and apparatus for mapping subsea hydrocarbon reservoirs, more particularly by using a transverse magnetic mode (TM mode) of an electromagnetic field source to register a TM response which is measured by one or more receivers submerged in water, by the essentially vertically oriented submerged transmitter generating intermittent electric current pulses with sharply defined terminations, and where an electromagnetic field generated by these pulses is measured by the submerged and essentially vertically oriented receiver, in the interval when the current in the electromagnetic field source is switched off. The distance between the antenna of the electromagnetic field source and the receiver antenna is smaller than the depth of the target object.

Seismology is a technique commonly used when mapping potential areas for oil prospecting. Seismic data provides information on the existence, location and shape of a hydrocarbon structure located in sediments in the ground.

However, a seismic survey provides information on the structure through registering the velocity of elastic waves responsive to the mechanical properties of the subsurface rocks, but the seismic data does not reveal much about the nature of the pore fluids present in the structure.

As for references, please refer to the complete bibliography that follows the description of the invention.

Marine prospecting wells are drilled to determine whether there are hydrocarbons present in the form of oil or gas, but the costs associated with this are very high and there are no guarantees of finding hydrocarbons in the structures drilled. In this situation, essential additional information about the contents of the reservoir may be obtained by electromagnetic (EM) methods.

The typical and simplest geoelectric model of an offshore sedimentary structure containing a reservoir of hydrocarbons can be represented as conductive half-spaces having a typical resistivity of 1-2 $\Omega m$, where an encapsulated thin resistive oil or gas containing layer with a thickness of 10-100 m has a resistivity of 20-100 $\Omega m$. The typical depth of the resistive layer is approximately 500-5000 m. The sediments are covered by more conductive seawater having a resistivity of 0.25-0.3 $\Omega m$, as well as non-conductive air. The greater resistivity of the hydrocarbon bearing reservoirs is used in all electromagnetic methods of prospecting for hydrocarbons as the principal indicator of the presence of oil and gas.

Magnetotelluric (MT) survey is a well known method used extensively in EM applications on shore. Some times the MT method is used for marine applications. The MT method uses the natural geomagnetic variations excited through interaction between solar wind and the main geomagnetic field.

The low sensitivity of the MT method with respect to resistive hydrocarbon layers is explained by the properties of the MT field. A magnetotelluric field is a flat wave that falls from the atmosphere and propagates vertically through the earth as TE fields (TE=transverse electric). It is well known that the TE field is insensitive to a thin horizontal resistive layer encapsulated in a more conductive structure. This is illustrated below. Thus the MT method is of limited use in marine EM prospecting for hydrocarbons.

Unlike the MT method, CSEM based methods (Controlled Source Electromagnetic Method) use both TE fields (occasionally called inductive mode) and TM (transverse magnetic) fields (occasionally called galvanic mode). CSEM methods are the most frequently used in marine EM prospecting, as they are more sensitive to a thin encapsulated resistive layer. Different forms (set-ups) of CSEM methods are used, depending on the types of transmitter and receiver. In the following, the term transmitter and receiver specifies the source and detector of electromagnetic fields. Some of the existing set-ups are illustrated in the following.

The most common CSEM systems in use consist of a horizontal cable that receives a heavy electric current (transmitter), the cable being disposed on or by the seabed, and horizontal electric receivers installed on or by the seabed at different distances from the transmitter. Such systems can either be permanently installed on the seabed over a measuring period, or they can be towed behind a vessel. In some set-ups they are accompanied by measurements of magnetic components of the EM field. These systems consist of a transmitter that sets up a strong alternating current in a subsea cable, and a set of receivers that perform measurements of electromagnetic fields in the frequency or time domain.

The most important characteristic of such systems is the requirement for a great offset between the transmitter and the receivers, 5-10 times the depth of a target, i.e. 5-10 km. Only under these conditions can the shielding effect of the seawater be suppressed and a suitable signal measured.

Furthermore, as will be illustrated below, in practice none of the existing set-ups that employ the above CSEM set-ups can provide the resolution required to uncover and examine the hydrocarbon bearing target areas encapsulated at depths of more than 3000 m, nor the resolution required in those cases where the thickness and resistivity of the hydrocarbon layer is insufficient. This limitation is the main drawback of all existing inventions based on a CSEM set-up.

The object of the invention is to remedy or reduce at least one of the drawbacks of prior art.

The object is achieved through features stated in the description below and in the following claims.

The invention describes a novel system consisting of a method and apparatus for electromagnetic prospecting for the purpose of locating a reservoir, examining its geometry and determining whether there are hydrocarbons or water in the reservoir. The method can also be employed if the area and its geometry are known from seismic or other data.

The aim of the proposed invention is to register reservoirs, also at depths exceeding 3000 m, increase the resolution of the results produced by an electromagnetic method of prospecting for hydrocarbon bearing targets, and to increase the efficiency of the survey. To achieve success it is suggested that electromagnetic fields are used only in the galvanic mode (TM mode), which has the maximum sensitivity with respect to resistive targets encapsulated in a more conductive stratum. The examples below illustrate the advantage of the proposed invention.

According to a first aspect of the invention there is provided a novel method of uncovering a reservoir and its nature. This method consists in exciting and measuring electromagnetic fields solely in TM mode induced in subsea strata, data processing and analysis for the purpose of determining the electric properties of the section and the resistance of the layer containing the reservoir, and thereby its nature.

According to a second aspect the invention describes an apparatus arranged to uncover a reservoir and its nature, which consists in generating and measuring electromagnetic fields solely in the TM mode in the subsea strata and subsequent data processing for the purpose of determining the electric properties of the section and the resistance of the layer containing the reservoir, and thereby its nature.

A third aspect of the invention proposes the use of an elongated, essentially vertically oriented electromagnetic field source, also termed a transmitter, to excite electromagnetic fields solely in the TM mode, at least one pair of transmitter electrodes arranged above each other being supplied with heavy current from a power source, via insulated cables, the transmitter electrodes allowing current to pass to the surrounding seawater. Such a transmitter excites electromagnetic fields solely in the TM mode, in horizontally uniform, stratified structures.

According to a fourth aspect of the invention the transmitter generates electromagnetic field pulses with sharply defined terminations and with intervals where the power is switched off, the transmitter pulse displaying the shortest possible rise time from a base value to a required maximum value, a maximum stability near the maximum value and then the shortest possible fall time back to the base value. Thus, a reference is provided for a signal intercepted by the receiver, the transmitter pulses forming the basis for processing and interpretation of signals returning from the surveyed structure. The receiver carries out response measurements of the electromagnetic field in the absence of the primary field.

According to a fifth aspect of the invention use is made of one or more submerged, essentially vertically oriented, elongated receivers comprising means arranged to register a field potential difference across the length of the receiver, for measuring a secondary field in the TM mode. Advantageously the receiver is provided with at least one pair of receiver electrodes arranged above each other.

According to a sixth aspect of the invention a distance R (offset) between the transmitter and the receiver is small enough to produce an induction zone condition. An induction zone is characterized in that the condition $0 \leq R \leq (t\rho_\alpha(t)/\mu_0)^{1/2}$ applies. Here, t is the time lag from the moment the power is switched off in the transmitter, $\mu_0 = 4\pi 10^{-7}$ H/m is magnetic permeability of vacuum, $\rho_\alpha$ is the average (apparent) resistivity of a substratum which at time t exhibits the same response as the surveyed cross section, R is the horizontal distance (offset).

According to a seventh aspect of the invention, several receivers may be used for the measurements, optionally synchronous measurements, in order to increase the efficiency of the survey.

According to an eighth aspect of the invention, the transmitter generates a special sequence of square pulses to suppress external noise, the pulse sequence being incoherent with the noise. The measured responses are then accumulated and the mean value calculated.

According to a ninth aspect of the invention, one or more fixed marine autonomous bottom stations monitor the variations of the magnetotelluric field in order to reduce the MT noise in the CSEM measurements.

According to a tenth aspect of the invention, pressure sensors are used in combination with electrodes to reduce the wave and swell noise in the CSEM measurements.

According to an eleventh aspect of the invention, the response functions undergo a series of transforms and inversions with subsequent construction of 1D, 2D, 2½D and 3D images, T (x,y) and σ (x,y,z) of the stratum.

According to a twelfth aspect of the invention, all other available geological and geophysical information is used during the planning stage and the data transformation and data inversion stage of the analysis and interpretation, in order to increase the resolution and unambiguousness of the structure of a section.

According to a thirteenth aspect of the invention, all steps of the survey, i.e. survey planning, data analysis, analysis and influence of the shore line, terrain reliefs on the seabed, the heterogeneity of the sediments and oil reservoirs etc., will to a large extent include the use of 1D, 2D, 2½D and 3D modelling.

The principal ideas of the present invention, its advantages and the drawbacks of prior art used in marine electromagnetic prospecting for hydrocarbons, will become apparent from the following description of the invention, which refers to the appended drawings, in which.

The well known magnetotelluric (MT) survey method is used extensively in electromagnetic surveys on shore, and sometimes offshore. The results of an MT survey are normally presented in the form of apparent resistivity pa and impedance phase.

FIGS. 1-4 in the accompanying drawings, which illustrate the resolution of the magnetotelluric method, show curves both for apparent resistivity and impedance phase for two basic models of the strata:

1) $h_1$ 1 km, $\rho_1$=0.3 Ωm, $h_2$=1 km, $\rho_2$=1 Ωm, $h_3$=40 m, $\rho_3$=1 Ωm, $\rho_4$=1 Ωm
and
2) $h_1$=1 km, $\rho_1$=0.3 Ωm, $h_2$=1 km, $\rho_2$=1 Ωm, $h_3$=40 m, $\rho_3$=50 Ωm, $\rho_4$=1 Ωm.

The first and second models describe the section without a resistive target layer (so-called "reference model") and with a thin, resistive layer ($h_3=40$ m, $\rho_3=50$ Ωm) and emulated hydrocarbon target, respectively. The resistivity of seawater and sediments are accepted as equal to 0.3 Ωm and 1 Ωm, respectively. The dashed and solid curves correspond to sections without and with hydrocarbon bearing layers, respectively.

Figure 1:
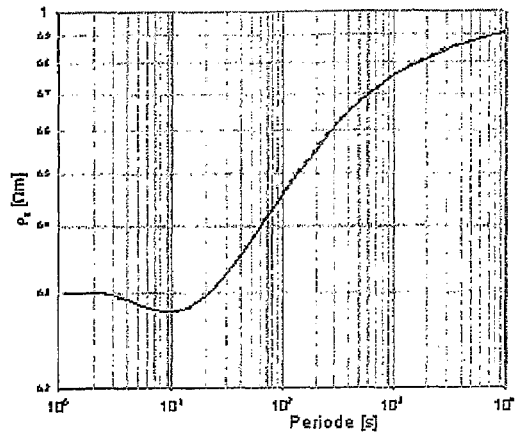
FIG. 1 depicts the MT curves for the apparent resistivity at the surface of the sea, for a typical model of the strata with and without a resistive, thin target layer.
Figure 2:
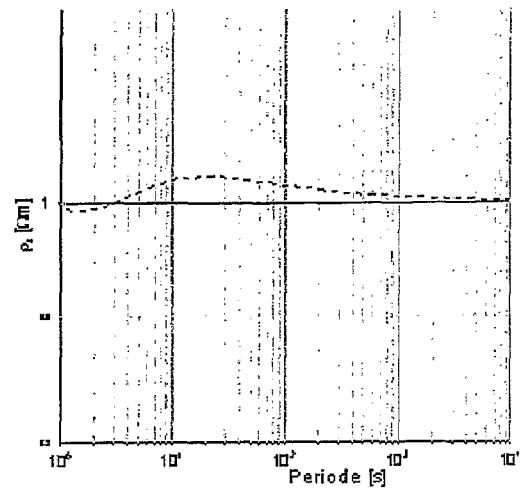
FIG. 2 depicts the phase-MT curves at the surface of the sea, for a typical model of the strata with and without a resistive, thin target layer.
Figure 3:
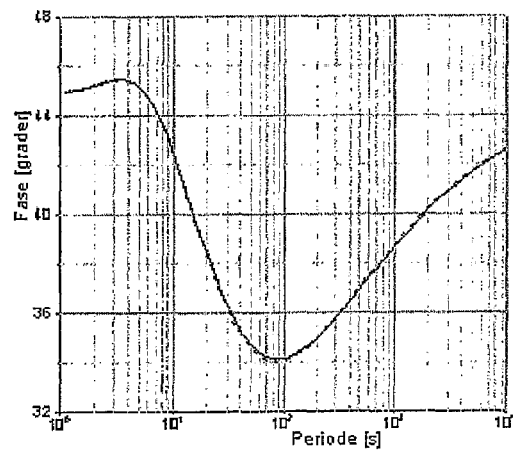
FIG. 3 depicts the MT curves for the apparent resistivity on the seabed, for a typical model of the strata with and without a resistive, thin target layer.
Figure 4:
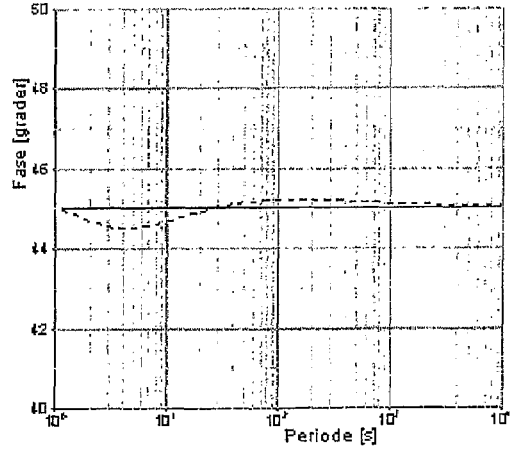
FIG. 4 depicts the phase-MT curves on the seabed, for a typical model of the strata with and without a resistive, target thin layer.

FIGS. 1 and 2 show curves representing the apparent resistivity and impedance phase at the surface of the sea, for the above described models. As can be seen, the effect of the hydrocarbon layer is so small (less than 1%) as to barely be detectable against the background noise. The resolution of MT curves may be improved by performing the MT measurements at the seabed. FIGS. 3 and 4 show curves representing the apparent resistivity and impedance phase at the seabed, for the same models. Indeed, the MT curves on the seabed are more sensitive to a resistive target (in the order of 3%), but their resolution is still rather low. Furthermore, the primary EM field will in this case be shielded by conductive seawater, such that the accuracy when determining MT test curves is much lower on the seabed, as compared with the surface of the sea.

Figure 5:
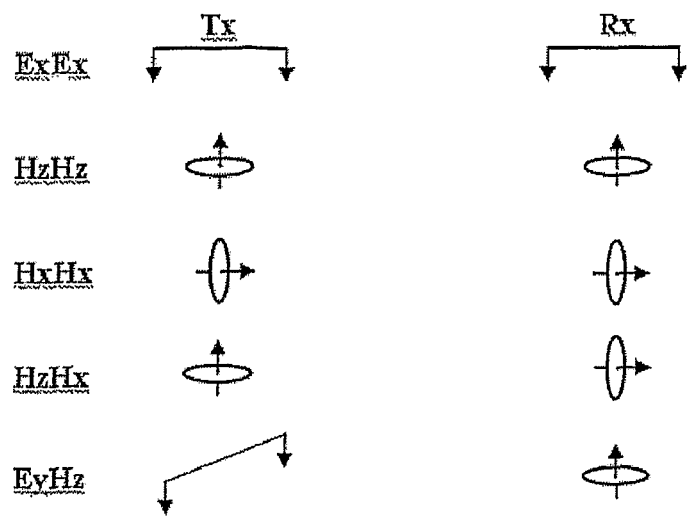
FIG. 5 depicts the typical CSEM designs used for marine EM prospecting.

Over several decades, various systems have been presented, which have been based on methods that include electromagnetic sources (CSEM) for marine applications. The most popular systems that can be used for marine surveys are shown in FIG. 5 (Cheesman et al., 1987). Here, the Tx and Rx columns indicate transmitter and receiver. The first and second letters, E or H, on the lines indicate electric or magnetic field component excited by a transmitter, and the third and fourth letters of the lines indicate electric or magnetic field component measured by a receiver. Occasionally, the EzHφ set-up (Edwards et al., 1985) is also used. (Here, z and φ indicate the vertical component and the azimuth component of the horizontal magnetic field, respectively. This system is not suited for surveys at great depths). A complete overview of CSEM methods as well as MT can be found in Chave et al., 1991.

Figure 6:
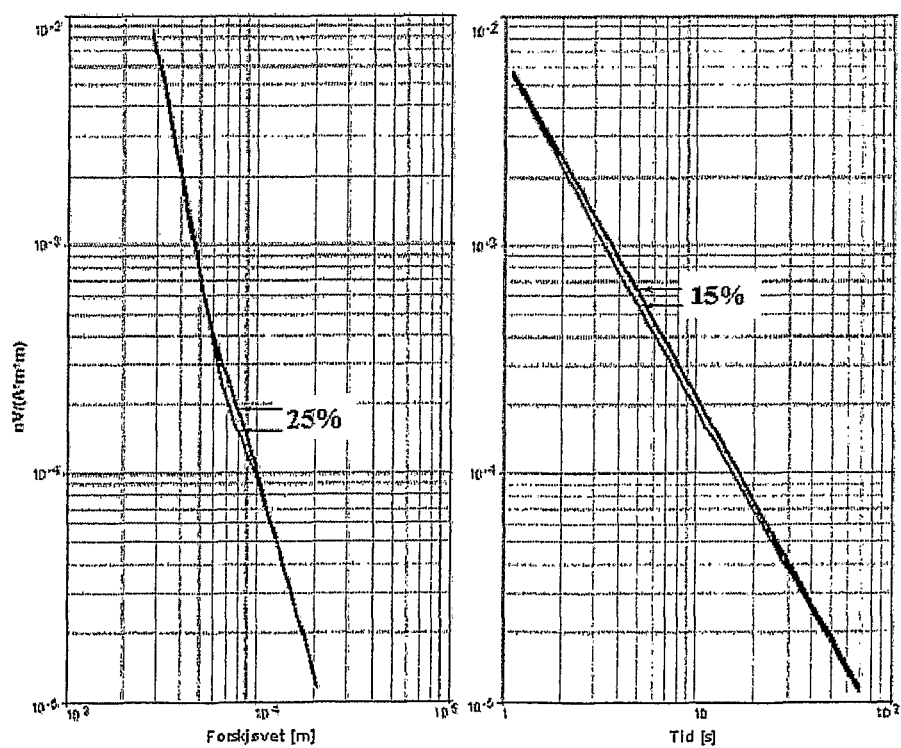
FIG. 6 depicts the resolution of voltage curves for PxEx(f)- and PxEx(t) set-ups in frequency (f=0.1 Hz) and time domains.
Figure 7:
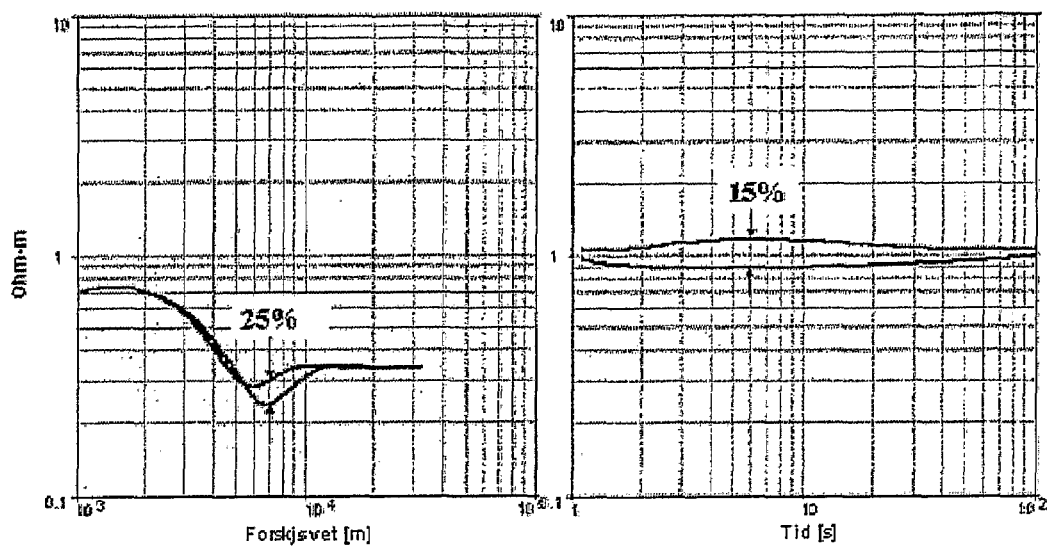
FIG. 7 depicts the resolution of curves for apparent resistivity for PxEx(f)- and PxEx(t) set-ups in the frequency (f=0.1 Hz) and time domains.

FIGS. 6 and 7 show the resolution of the most popular ExEx set-up (Eidesmo et al., 2002); MacGregor et al., 2004; Johansen et al., 2005 and others) for a CSEM method in frequency and in time domains. The cross sectional models used for the calculations are the same models 1 and 2 as used for the MT modelling. Evidently, this CSEM method has a higher resolution compared with the MT method: 25% and 15% for the frequency and time domains, respectively. However, as can be seen from FIG. 6, the measured signal is very small, and it may be less than fractions of microvolts, even in cases were the current in the transmitter line is as much as 1000 A and the transmitter antenna is several hundred meters. With such small signals, noise generated by natural and artificial sources cause problems in the analysis and interpretation of the survey data. In the case when the transverse resistance of the hydrocarbon layer is not high enough, existing CSEM methods can not produce any results, they may produce ambiguous results or they may produce erroneous results.

A novel method proposed in the current invention differs from all known methods in that it exhibits a higher sensitivity and resolution with respect to a resistive, thin layer which is a direct indicator of the presence of hydrocarbon targets. Beyond this, this method, in combination with the proposed apparatus, provides higher survey efficiency.

Firstly, only the TM mode is used, both for excitation of the primary electromagnetic field, generated by the transmitter, and for measurements by the receiver. This is achieved by using a long, submerged, essentially vertically arranged electromagnetic field source antenna or transmitter antenna, e.g. two vertically spaced transmitter electrodes 1108 arranged above each other, hereinafter also termed transmitter cable, which is connected to a power source via cables, one transmitter electrode acting as an anode and the other as a cathode, and the transmitter antenna receiving square pulses for excitation of EM fields in strata, and a submerged, long, essentially vertically oriented receiver antenna, hereinafter also termed receiver cable, e.g. two vertically spaced receiver electrodes arranged above each other, for the receiver's measurements of potential differences in a vertical component of the electric field. The transmitter field strength will be given by the amplitude of the current pulse (Ampere) and the spacing between the transmitting electrodes. In a horizontally uniform section such a source will only excite EM fields in the TM mode. TM modes that are insensitive to thin, resistive layers in sections are completely absent, and will not reduce an appropriate signal level.

Figure 8:
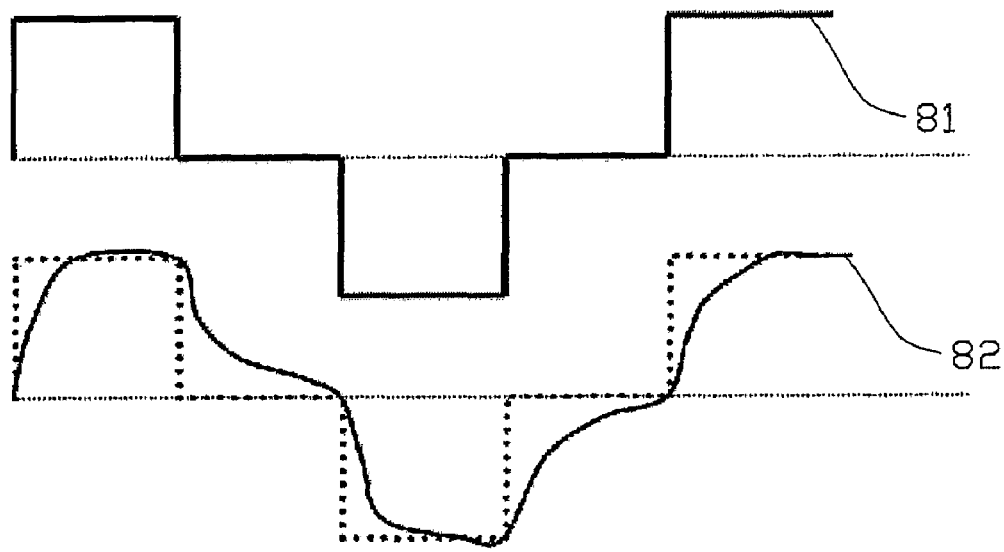
FIG. 8 depicts a diagram of shapes of current waves present in different places in the system according to the invention.

Secondly, the transmitter cable is supplied with pulsed current as shown in FIG. 8, curve 81. Note that a real signal (curve 82) deviates from the ideal shape described by curve 81 due to the influence of technical limitations of the real system. The response measurements are displayed by the receiver cable in the time domain after the current in the transmitter has been switched off. This type of arrangement will provide measurements of the EM field only, induced into the strata by the diminishing currents from the background when the transmitter current is absent, i.e. only an acceptable signal not masked by a primary field.

Thirdly, the distance R (offset) between the transmitter and receiver is selected to be less than the survey depth, i.e. when the condition $0 \leq R \leq (t\rho_\alpha(t)/\mu_0)^{1/2}$ applies. This distance, known as the "induction zone", improves the characteristics of the method considerably, as it makes it possible to measure the transfer function with small distances where the signal is strong enough to provide an acceptable signal/noise ratio.

For simplicity, the method and apparatus according to the invention is called "TEMP-VEL" (Transient ElectroMagnetic Marine Prospecting with Vertical Electric Lines).

Figure 9:
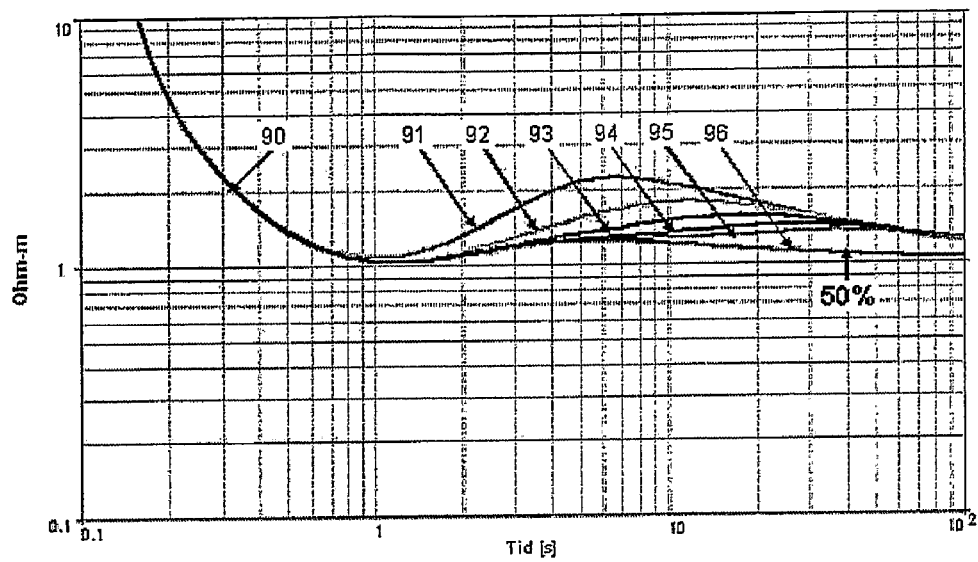
FIG. 9 depicts the resolution of curves for apparent resistivity for a system according to the present invention for electromagnetic offshore surveys.
Figure 10:
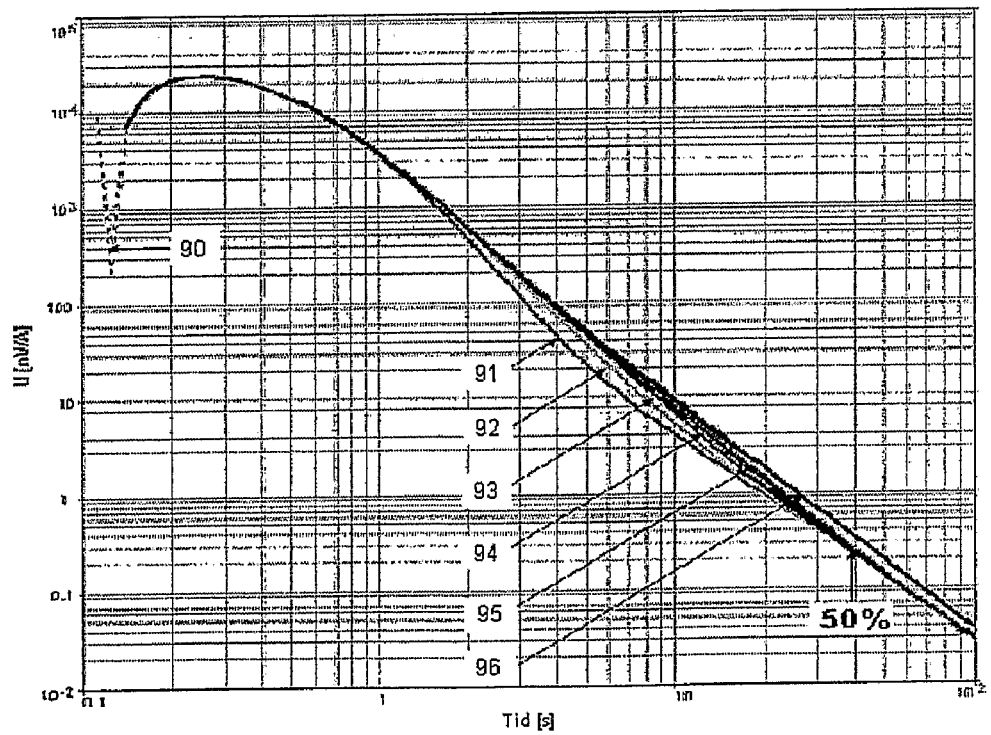
FIG. 10 depicts the resolution of the voltage curves for a system according to the present invention for electromagnetic offshore surveys.

FIG. 9 (which shows apparent resistivity) and FIG. 10 (which shows voltage) illustrate the resolution of the TEMP-VEL method with respect to the above determined reference model, and contains no resistive hydrocarbon layer (curves 96 in the figures). Calculations have been carried out for various depths of the resistive hydrocarbon layer: 1, 2, 3, 4, 5, and ∞ km–curves 91, 92, 93, 94, 95 and 96, respectively. The offset for all curves is 500 m. The voltage in FIG. 10 has been normalised in both cable lengths, to apply to a length of 1 m and a current value of 1 A.

As can be seen, the position of the left branch 90 of the curves is determined by the thickness and resistivity of seawater, as well as by the length and geometry of the power cable. The target is resolved even at a depth of 5000 m.

The challenge is how to arrange the signal measurements, as the signal may be weak in situations where the target is located at a great depth and has insufficient resistivity. The TEMP-VEL set-up exhibits four parameters to enhance the signal amplitude; Length of transmitter line, transmitter current amplitude, length of receiver line and offset value. In real situations a manipulation of these parameters will provide the signal value in the range from hundreds of nanovolts to tens of microvolts.

The measured response is then converted into resistivity relative to depth through various methods which will be discussed below.

The TEMP-VEL method described in the previous section is realized through the TEMP-VEL apparatus.

Figure 11:
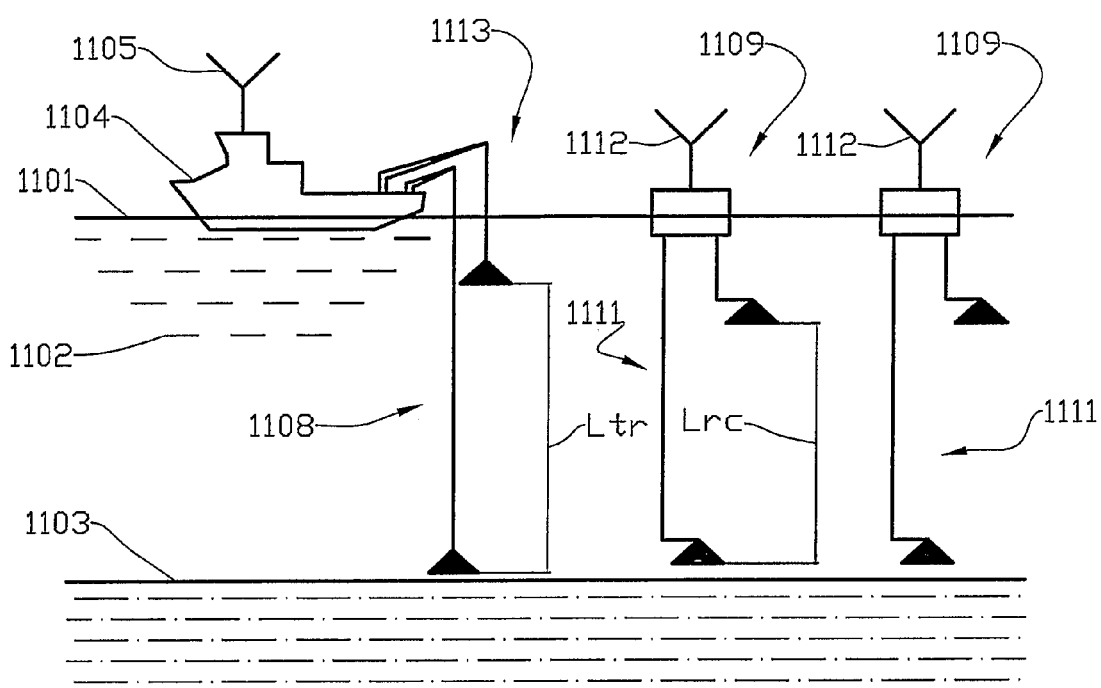
FIG. 11 depicts a schematic side view of an arrangement of transmitter and receivers in a system according to the present invention for electromagnetic offshore surveys.

FIG. 11 shows a schematic cross section through seawater 1102. Reference numbers 1101 and 1103 denote a surface of the sea and a seabed. A vessel 1104 is provided with an electromagnetic field source 1113, also termed a transmitter. One or more receivers 1109 are arranged at defined distances) from the vessel 1104.

For a measuring period the vessel 1104 and the receiver/receivers 1109 are stationary for the time it takes to collect the data at the quality that provides the required signal/noise ratio. After checking that the quality of the data is suitable for further processing, the vessel 1104 changes its position with all the sets of receivers 1109. This is the primary survey method.

Occasionally, when a survey is performed along profiles and there is no need to accumulate data (if the depth of the hydrocarbon layer is sufficiently small), this method can be changed to a slow constant movement of the vessel 1104 with the transmitter 1113 and tow-behind receivers 1109.

Figure 12:
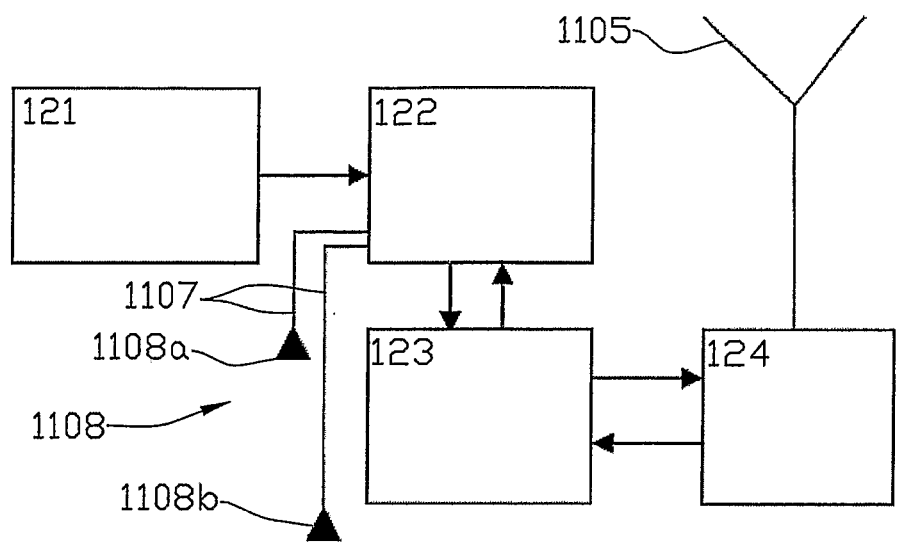
FIG. 12 depicts a schematic block diagram of a power supply unit.

The vessel 1104 is provided with an antenna 1105 for communication as well as a power supply unit, also termed generator 121 (see FIG. 12). Heavy current is generated by the power supply unit 121 and passed through cables 1107 and transmitter electrodes 1108a, 1108b which are arranged at different depths in the sea 1102 and form a transmitter antenna 1108. The power moment Pz of a transmitter 1113 is equal to $L_{Tr} \times I$, where $L_{Tr}$ is the vertical distance between the transmitter electrodes 1108a, 1108b and I is the amperage. The greater Pz is, the better, as this moment is of great importance to the registered signal value.

The same condition applies to the receivers 1109. The vertical component of electromagnetic fields induced in strata by current in the transmitter 1113 is measured by one or more essentially vertical receiver antennas 1111, each of which is made up of at least one pair of receiver electrodes 1111a, 1111b connected to the receiver 1109 by cables 1110, and where the vertical distance between the receiver electrodes 1111a, 1111b is equal to $L_{Rc}$. The value of a received signal Vz is equal to $L_{Rc} \times Ez$, where Ez is equal to the electrical component of the received signal in the z-direction. The voltage of the measured signal is proportional to $L^4$ if both the transmitter line and the receiver line have the same length L equal to the depth of the sea. Thus the general conditions for the TEMP-VEL system are highly favourable when the reservoir depth is great and $L_{Tr}$ and $L_{Rc}$ exhibit a length of 500-1000 m and the amperage I=1-5 kA.

There is provided acoustic units at the electrodes 1108a, 1108b, 1111a, 1111b for exact determination of the position of the electrodes 1108a, 1108b, 1111a, 1111b, and also pressure sensors (not shown). Obviously, it is not possible to install the transmitter electrodes 1108a, 1108b and 1111a, 1111b, respectively, absolutely vertically above each other. Moreover, the vessel 1104 moves slightly during the measurements due to wind and currents. The real positions of the transmitter electrodes 1108a, 1108b are registered, and the required correctional data is calculated and taken into account in the data processing and interpretation. The data from the pressure sensors is used to reduce the EM noise caused by waves on the surface of the sea.

Communication between the vessel 1104 and all the receivers 1109 takes place via the antennas 1105, 1112 and communication units described below.

FIG. 12 shows a block diagram of the transmitter 1113. A powerful power generator 121 generates an alternative current which is converted by a pulse generator 122 into series of square current pulses like that drawn in FIG. 8. The duration of the on and off stages of the pulses covers the range 0.01-100 seconds.

In practice, the pulse series are formulated by the controller 123 in a way that suppresses noise. Incoherence between pulses and noise is determined in the wait state when the transmitter current is switched off. A transmitter controller 123 controls the power generator 121, the pulse generator 122, the process of delivering power to the transmitter electrodes 1108a, 1108b, the calibration of the system, the data acquisition process, real time control of the entire system etc. The cables 1107 are terminated in the transmitter electrodes 1108a, 1108b, which have the ability to efficiently transfer the current pulses to seawater and remain in a stable position submerged in the water 1102.

The principal arrangement for the TEMP-VEL surveys is "stationary registration", the vessel 1104 and the receivers 1109 being stationary for the time required to provide the necessary quality of measurement data. The communication block 124 takes care of the communication processes between the transmitter 1113 and all the receivers 1109 via an antenna 1105, and participates in the data acquisition process throughout the survey.

Calibration of the system is performed periodically during the registration process. From time to time, the operator will, based on a data check, determine the left branch of the apparent resistivity curve 90 (with a small time lag), then compare this with the theoretically calculated response for a real TEMP-VEL set-up geometry and the seawater conductivity, and compare it with the actual value of the seawater conductivity determined at the actual conditions in consideration of temperature, salinity and pressure.

Figure 13:
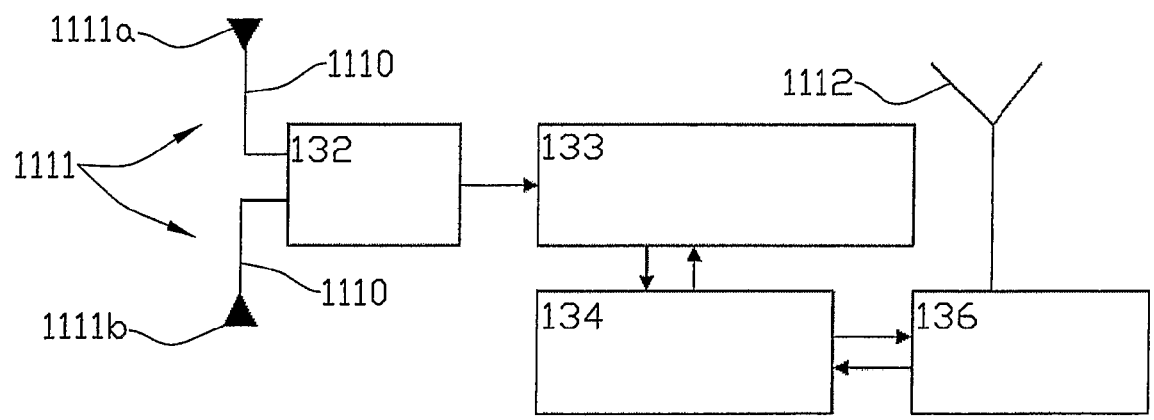
FIG. 13 depicts a schematic block diagram of a receiver unit.

FIG. 13 shows a block diagram of the receiver 1109 in FIG. 1. The induced electric field is measured by means of the receiver antenna formed by the receiver cables 1110 that terminate in the non-polarised receiver electrodes 1111a, 1111b. After amplification through a low-noise amplifier 132 the signal is digitized through an analogue/digital converter (ADC) 133 and transferred through a receiver control unit 134, a communication block 136 and the antenna 1112 to the vessel 1104 for full processing and subsequent analysis. The receiver control unit 134 changes the data acquisition arrangement in accordance with commands from the vessel 1104, which houses the primary centre for the survey. The signals may also be transferred to a shore based control centre where these decisions can be made.

The strategy of the field work has been developed based on information about the area being surveyed, received from geological and geophysical data. 1D, 2D, 2½D or 3D modelling of the electromagnetic situation is produced, and the expected signals from the TEMP-VEL system are evaluated. Both the optimum arrangement for the system installation and the measurement arrangement are planned on the basis of these signals and the required resolution in the vertical and horizontal directions.

Figure 14:
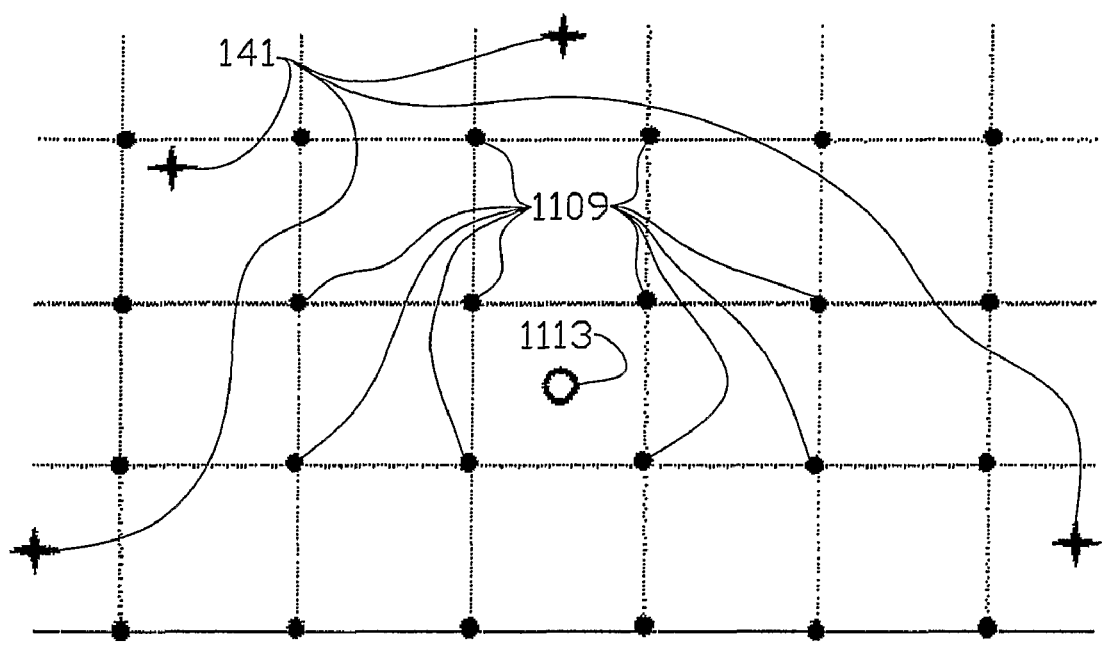
FIG. 14 depicts a schematic plan view of an arrangement of transmitter and receivers in a system according to the present invention for electromagnetic offshore surveys.

One of the possible survey arrangements is shown in FIG. 14. The entire survey area is divided into subareas. The vessel 1104 carrying the transmitter 1113 is stationed at the centre of each subarea. The receiver sets 1109 are deployed around the vessel 1004 at the distance that satisfies the induction zone requirement. Furthermore, a network of autonomous magnetotelluric stations 141 is deployed in the area. These stations 141 are used to reduce any noise produced by geomagnetic variations. The duration of the measurements in each subarea is determined by many factors, including the characteristics of the section, amperage, ocean depth, the length of the transmitter and receiver antennas 1108, 1111, noise etc. The synchronous or asynchronous accumulation of data is carried out during these measurements. After checking the quality of the data, the vessel 1104 and all receiver sets 1109 are positioned in a new location.

Following preprocessing and analysis, the collected data is either converted into voltage profiles or to apparent resistivity vs. time or depth in the category of gradient sections, or it is inverted into resistivity vs. depth in the category of stratified structures. In those cases where the influences on the electromagnetic field structure from lateral non-homogeneities are not substantial, the inversion is performed in models in the 1D category. In other instances, data inversion and interpretation are performed in models in the 2D, 2½D or 3D category.

The invention claimed is:

1. A method for an electromagnetic survey of electrically resistive target objects that potentially contain hydrocarbons, said method comprising:
   determining electrical characteristics of a stratum being surveyed by use of a transverse magnetic mode of at least one electromagnetic field source and registration of a transverse magnetic response;
   generating an intermittent source current pulses with a sharply defined termination in the at least one electromagnetic field source;
   transferring the intermittent source current pulses to a submerged, essentially vertical transmitter antenna and into the strata;
   intercepting a medium response with at least one receiver deployed in an induction zone and provided with at least one submerged, essentially vertical receiver antenna, in time between consecutive current pulses; and
   measuring strata response in the induction zone, wherein the horizontal distance between the at least one transmitter antenna and the at least one receiver is equal to R, and $R \leq (t\rho_\alpha(t)/\mu_0)^{1/2}$, where t is the time lag counted from the instant after the electromagnetic field source has been switched off, $\mu_0 = 4\pi 10^{-7}$ H/m, and $\rho_\alpha(t)$ is the apparent resistivity of a substratum in the period t.

2. A method for an electromagnetic survey in accordance with claim 1, further comprising succeeding each current pulses in a special sequence which is incoherent with a present signal noise, and stacking the responses measured by the at least one receiver to provide a signal/noise ratio which is sufficient for detection of the target.

3. A method for an electromagnetic survey in accordance with claim 1 further comprising suppressing signal noise by processing time coded geomagnetic data and time coded source pulse data.

4. A method for an electromagnetic survey in accordance with claim 1 further comprising suppressing signal noise by processing time coded water pressure recordings, collected in the immediate vicinity of the receiver antenna of the at least one receiver and compared with the time coded source pulses.

5. A method for an electromagnetic survey in accordance with claim 1, further comprising evaluating acquired data and carrying out at least one action selected from the group consisting of: continuing to measure, changing an operating mode, changing measurement sites and retrieving one or more of the means of signal generation.

6. A method for an electromagnetic survey in accordance with claim 1, further comprising at least a portion of the collected data is transferred to a central processor and analysed in real time.

7. A method for an electromagnetic survey in accordance with claim 1, further comprising the at least one electromagnetic field source and the at least one receiver are stationary during a registration interval and are then relocated to another position in the survey area.

8. A method for an electromagnetic survey in accordance with claim 1, further comprising the at least one electromagnetic field source and the at least one receiver are in constant motion in the survey area during the registration.

9. An apparatus for an electromagnetic survey of electrically resistive targets that potentially contain hydrocarbons, said apparatus comprising:
   a submerged, essentially vertical transmitter antenna that acts as a source of a transverse magnetic mode of an electromagnetic field;
   a power source arranged to deliver electric power, and a controlled source electromagnetic pulse generator arranged to deliver series of intermittent square pulses with a duration of 0.01-100 seconds, an amplitude of 0.1-10000 A and a sharply defined termination to the transmitter electrodes of the electromagnetic field source; and
   at least one receiver deployed in the induction zone and provided with at least one submerged, essentially vertical receiver antenna, the receiver being arranged to register the vertical electromagnetic field during intervals between the intermittent current pulses.

10. An apparatus in accordance with claim 9, said essentially vertical transmitter antenna of the transmitter comprising being arranged to register the vertical electromagnetic field during intervals between the intermittent current pulses.

11. An apparatus in accordance with claim 9, further comprising said acoustic sensors are provided in the immediate vicinity of upper and lower end portions of the receiver antenna.

12. An apparatus in accordance with claim 9, further comprising said pressure sensors are provided in the immediate vicinity of upper and lower end portions of the receiver antenna.

13. An apparatus in accordance with claim 9, further comprising said at least one electromagnetic field source of the apparatus and at least one of the at least one receiver are arranged to move under control or autonomously during or between the measurements, the measurements being performed continuously or sequentially.

14. An apparatus in accordance with claim 9, further comprising a means of real time transfer of at least a selection of the collected data to a central processor.

15. An apparatus in accordance with claim 9, further comprising sensors for measuring the three component electrical field are arranged at one or more locations on a seabed.

16. An apparatus in accordance with claim 9, further comprising sensors for measuring three component magnetic field in geomagnetic variations are arranged at one or more locations on a seabed.

* * * * *